United States Patent [19]
McMann

[11] 3,829,607

[45] Aug. 13, 1974

[54] SINGLE TUBE COLOR CAMERA SYSTEM AND METHOD

[75] Inventor: Renville H. McMann, New Canaan, Conn.

[73] Assignee: Columbia Broadcasting System, Inc., New York, N.Y.

[22] Filed: May 24, 1973

[21] Appl. No.: 363,533

[52] U.S. Cl. .......... 178/5.4 ST
[51] Int. Cl. .......... H04n 9/06
[58] Field of Search .......... 178/5.4 ST

[56] References Cited

UNITED STATES PATENTS

| | | | |
|---|---|---|---|
| 3,479,450 | 11/1969 | McMann, Jr. | 178/5.4 ST |
| 3,483,315 | 12/1969 | McMann, Jr. | 178/5.4 ST |

*Primary Examiner*—Robert L. Richardson
*Attorney, Agent, or Firm*—Martin Novack, Esq.; Spencer E. Olson, Esq.

[57] ABSTRACT

A single tube color television camera system for producing coherent color video signals representative of the color content of a scene. A filter is disposed in the optical path of the scene, the filter having an array of colored areas thereon. Means are provided for electronically raster scanning the image projected through the filter and for generating color signals representative of the filtered image. Means are also provided for periodically projecting a uniformly colored field on the filter in conjunction with the scene. Further means, including a delay, are provided for receiving the generated color signal and developing a difference signal as between color signals generated during successive periods when the uniformly colored field is present and absent. Finally, means are provided for demodulating the generated color signal with the difference signal. In one embodiment of the invention the uniformly colored field is projected during alternate fields of video information. In another embodiment of the invention, the uniformly colored field is projected during successive lines of each field of video information.

18 Claims, 3 Drawing Figures

PATENTED AUG 13 1974 3,829,607

SHEET 1 OF 3

SINGLE TUBE COLOR CAMERA SYSTEM AND METHOD

BACKGROUND OF THE INVENTION

The type of color television camera that is currently in most widespread use employs three image pickup tubes to derive separate primary color signals. These cameras have limited acceptability because they are expensive and difficult to maintain. For this reason, there have been a number of recent attempts at developing color cameras which require less than three tubes to produce the desired color signals. Many of these schemes involve the use of patterned filters in the optical path of the camera.

In one of the single tube techniques, the sole camera tube receives the color scene through an optical filter composed of recurring vertical striped sections. Each striped section includes a red, a blue, and a green filter stripe, so that signals corresponding to the three primary colors can be generated by the one camera tube. In this system, limitations of the scan linearity of the tube's scanning beam necessitate that indexing signals be provided so that a reference exists for sampling the proper color at the proper time during the beam scan. Therefore, each striped section includes a black indexing stripe that is used to generate an indexing signal. This technique has the disadvantage of consuming essential filter space and introducing a large number of recurring discontinuities in the scanning of the color scene.

Another class of single tube prior art systems operates on the basis of an assignment of a specific frequency to each color signal. In these systems, different orientation angles are provided for the different stripe colors and the generated chrominance signal components are distinguished from each other by frequency. Separation is achieved using electronic filters. These types of systems are desirably insensitive to scan nonlinearity since the resulting frequency changes are not large enough to significantly alter the selectivity characteristics of the separation filters. However, a problem with these systems stems from the crowding of the frequency spectrum, since substantial bandwidth need be provided for each of the different color signals.

In my U.S. Pat. No. 3,479,450, there is disclosed another type of color camera system which requires only a single camera tube for derivation of color information signals. Briefly, an embodiment of that system operates in the following manner: An object field being viewed is separated into its respective primary color components with a color stripe filter interposed between the object field and the camera target. The filter consists of a sequence of successive red, green and blue filter stripes in a parallel manner at right angles to the lines of the camera scanning raster. The signal output from the camera represents a sequential series of segments of the respective primary color components present in the object field. During selected scanning fields, a particular colored object field (red) is interposed in the camera's field of view so that the video signal that is generated during that field relates to the relative position of the red stripes of the filter as a function of the scanning beam position. The video signal generated during the selected scan is stored on a recording means, such as a rotating disc.

During subsequent field scans, the recorded information is utilized as an "index" to separate out the red, green and blue portions of the video signal generated by the camera tube. Specifically, this is done by using the recorded signal to enable a "red" gate to pass the video signal from the camera only during the presence of the recorded indexing signal. In this manner, a red color signal is derived, it being assumed that the scanning beam will be traversing red stripes at substantially the same relative time periods during a number of successive field scans.

The blue and green color signals are derived in a similar manner but, in these cases, delay lines are used to delay the occurrence of the recorded indexing signals by amounts that correspond to the time it takes for the scanning beam to traverse individual stripes during a line scan. To illustrate, if a red indexing signal begins at a particular time, then, depending upon the width of the red stripe and the scanning speed, the beam will begin to traverse the neighboring blue stripe a short predetermined time after the given time, for example, a fraction of a microsecond later. Therefore, a "blue" gate, which also receives the video signal from the camera, is enabled by the stored indexing signal as delayed by the predetermined time. The output of the blue gate is the blue color signal. It takes about twice the predetermined time for the beam to reach the green stripe, so an accordingly longer delay time is introduced before the indexing beam is received at a "green" gate which generates the green color signal.

In the particuar embodiment of the referenced patent, a second camera tube is utilized to obtain a luminance signal which is coupled to standard matrixing circuitry along with the derived red, green, and blue color signals. The outputs of the matrixing circuitry are signals commonly designated I, Y and Q, and these can be subsequently encoded to produce composite color video in NTSC form.

The elimination of the need for special indexing stripes in the filter setup is advantageous, but various aspects of the described technique for accomplishing indexing have need of improvement. One drawback relates to the utilization of a disc storage medium. The time base stability needed for derivation of the color signals using stored index signals is of the order of fractions of microseconds, and the maintenance of the required accuracy over a field scan using a disc or other moving magnetic storage is difficult. The described technique utilizes a number of filter stripes that are sufficiently narrow to resolve colors with required accuracy, but may not be sufficiently narrow to yield a luminance signal that meets required standards. Accordingly, the particular described embodiment utilizes a second camera tube to derive a luminance signal. If the number of filter stripes had been increased so that an acceptable luminance bandwidth was obtainable, the time base stability requirements of the storage drum would have had to be even more stringent. Thus, it was practical to utilize a second tube to achieve luminance, the substantial performance improvement being traded-off against the increased cost and alignment problems associated with a second tube.

Another scheme, intended as an improvement over that of U.S. Pat. No. 3,479,450 just described, is disclosed in my copending application Ser. No. 267,998 entitled "Single Tube Color Television Camera System and Method" that was filed June 30, 1972 and is now U.S. Pat. No. 3,755,620, and assigned to the same assignee as the present invention. In that copending application there is disclosed an embodiment in which a filter is disposed in the optical path of the scene, the filter having a striped array of colored areas thereof. A single camera tube electronically scans the image projected through the filter and generates color signals representative of the filtered image. The color signals are translated to a lower frequency and means are provided for projecting, during selected field scans, a uniformly colored field on the filter. The translated color signals generated during the selected field scans are stored in a digital storage circuit. Subsequently, the translated color signals generated during non-selected fields are modified in accordance with a stored signal to produce coherent chroma signals.

The system described in the abovereferenced patent and application each disclose an embodiment wherein a uniformly colored field is substituted for the image at selected intervals, the duration of the interval being manually selected by an operator. A field of video information is, of course, lost whenever the uniformly colored field is interposed, but for certain applications this loss of information is acceptable. Also, it is assumed in the described patent and application that the indexing information that is stored when the uniformly colored field is interposed will be valid for a substantial period of time, for example one minute. In other words, it is necessary to "refresh" the stored indexing information every so often. The recommended refresh interval depends upon the inherent scan stability of the tube and operating conditions such as the amount of necessary camera motion.

It is one object of the present invention to provide a single tube color television camera system and method which overcome limitations of prior systems and provide heretofore unavailable operational advantages.

SUMMARY OF THE INVENTION

The present invention is directed to a single tube color television camera system for producing coherent color video signals representative of the color content of a scene. A filter is disposed in the optical path of the scene, the filter having an array of colored areas thereon. Means are provided for electronically raster scanning the image projected through the filter and for generating color signals representative of the filtered image. Means are also provided for periodically projecting a uniformly colored field on the filter in conjunction with the scene. Further means, including a delay, are provided for receiving the generated color signal and developing a difference signal as between color signals generated during successive periods when the uniformly colored field is present and absent. Finally, means are provided for demodulating the generated color signal with the difference signal.

In one embodiment of the invention the uniformly colored field is projected during alternate fields of video information. In another embodiment of the invention, the uniformly colored field is projected during successive lines of each field of video information.

Further features and advantages of the invention will become more readily apparent from the following description when taken in conjunction with the accompanying drawings.

DESCRIPTION OF THE PREFERRED EMBODIMENT

Figure 1:
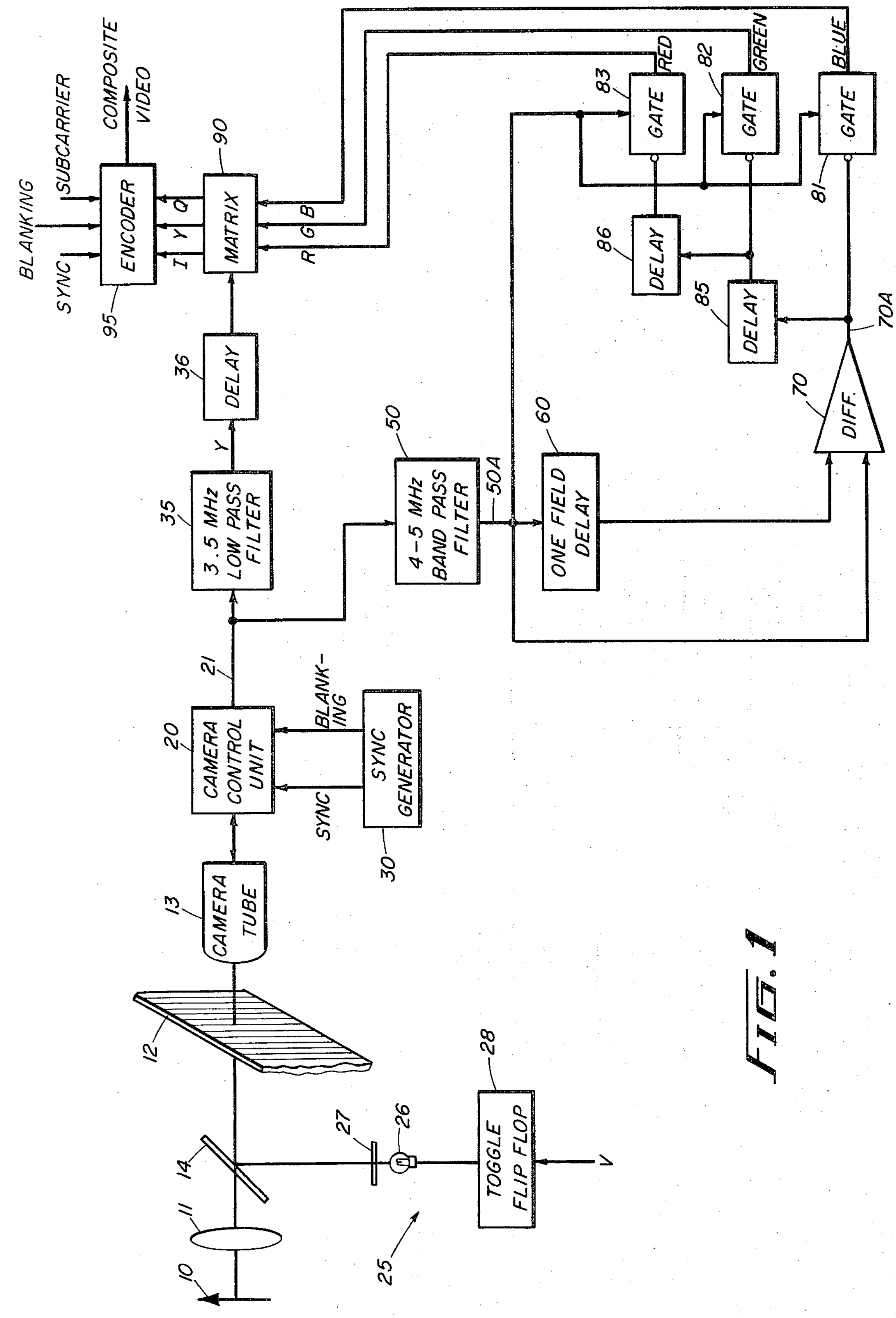
FIG. 1 is a block diagram of a color television camera in accordance with an embodiment of the invention.

Referring to FIG. 1, there is shown a color television camera system in accordance with the present invention. Light from an object field 10 is collected by an optical system represented pictorially by the lens 11. The collected light passes through a filter 12 that has an array of colored areas thereon. Preferably, the filter has a striped pattern that includes a number of groups of narrow primary-colored stripes, each group consisting of successive red, blue and green vertical stripes. The filtered light from the object field is received by an electronic scanning device or tube 13 which may typically comprise a vidicon or plumbicon of the type associated with a standard black and white television camera. The filter may be disposed on a fiber optics faceplate that is adjacent the photosensitive surface of the tube. The tube 13 is controlled by a conventional camera control unit 20 which receives vertical and horizontal synchronizing signals and blanking signals from a conventional sync generator circuit 30.

Further included in the optical arrangement is a semi-transparent mirror 14 which is positioned in the path of the object field 10 and allows passage of the scene to the filter and camera. The mirror 14 is oriented to receive a uniformly colored field from a subsystem 25 and superimpose the light from the uniformly colored field with the light from the object field 10 so that both are ultimately received by the filter 12 and then the camera 13. The subsystem 25 includes a light source 26 and a filter element 27 which, in the present embodiment, is selected to pass only blue wavelengths. It will be understood, however, that there are various alternate sources of monochromatic light that could be utilized. The light source 26 is energized but the output of a toggle-type flip-flop 28 which receives and is triggered by the vertical synchronization signal, V, from the sync generator 30. The output of flip-flop 28 is thus "on" during every other television video field and "off" during the alternate fields. This means that the monochromatic light is superimposed with the light from the object field during every other television field.

As stated, the camera tube 13 is of the conventional black and white variety, so it has no ability to determine the color of the impinging light, but detects only the intensity at successive points on the target area. The camera tube output, represented as a signal on a line 21, includes a relatively low frequency monochrome component and a relatively high frequency component that contains chrominance information. The high frequency chrominance signal is present by virtue of the narrow stripe pattern which serves to effectively divide the object scene into color stripe components as a function of position.

Figure 2:
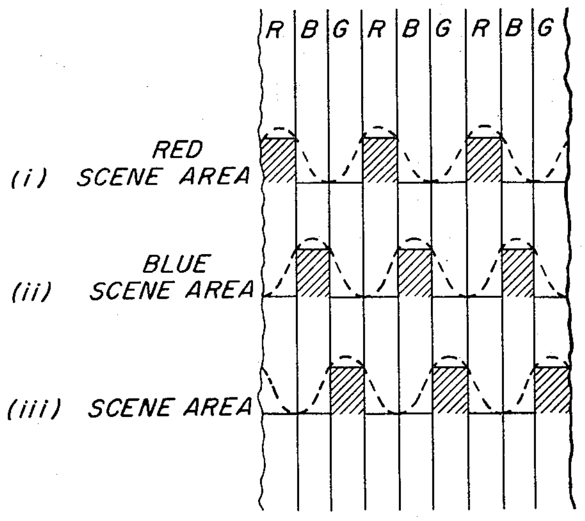
FIG. 2 is a simplified graph of electrical signals developed when scanning areas of different colors through a stripe filter.

The basic frequency of the chrominance information is determined by the number of stripes traversed by the scanning beam per unit time. In the present embodiment there are 225 groups of "triplets" of red, blue and green stripes so that, for an active horizontal scan time of about 50 microseconds, the resultant chrominance carrier signal is 4.5 MHz.; i.e., 225 divided by $(50 \times 10^{-6})$. The chrominance information is contained in the relative phase of the 4.5 MHz. chrominance signal. This is illustrated for a situation of approximately equal stripe widths in the simplified graph of FIG. 2 which depicts the electrical signals that are developed by scanning scene areas of different colors. In graph (i), the signal developed when scanning a red scene is shown as an idealized rectangular wave having positive portions (shaded in the FIGURE) that correspond in time with the scanning of the red stripes. The broken line curve represents the fundamental frequency component of the rectangular wave which is at 4.5 MHz. in the present embodiment. The signals developed when scanning the same area with a blue or green scene portion present are shown in graphs (ii) and (iii) respectively. These signals also have a 4.5 MHz. fundamental, but have different relative phases due to the relative spatial positions of the color stripes.

Referring again to FIG. 1, the camera tube output on line 21 is coupled to a low-pass filter 35 which has a filter characteristic that passes frequencies between about 0 MHz. and 3.5 MHz. This filter rejects the chrominance component of the camera output, which was seen above to be centered at 4.5 MHz., and passes the lower frequency which represents the luminance content of the scene being observed. The stripes in the pattern of the present embodiment are sufficiently narrow to yield an acceptable bandwidth luminance signal and still have sufficient bandwidth remaining to contain the color information.

The signal on line 21 is also coupled to a bandpass filter 50 that has a characteristic which passes frequencies between about 4 and 5 MHz. The filter 50 limits the bandwidth of the color information to 1 MHz., this bandwidth being sufficient to meet the capabilities of practical receiver systems. The output of filter 50 is therefore a 4.5 MHz. color signal 50A having a bandwidth of 1 MHz. The signal 50A is coupled to a one field delay 60 which may be of any suitable form such as the magnetic storage media described in the abovereferenced U.S. Pat. No. 3,479,450. Preferably, however, the field delay would be of the digital storage type.

The output of the delay 60 is received at one input terminal of a difference amplifier 70, the other input terminal receiving the undelayed signal 50A. The difference amplifier 70 subtracts the undelayed signal 50A from the delayed version to produce an output indexing signal 70A. In the present invention, the signal 70A is utilized as an indexing signal which contains information that relates to the scanning characteristics of the beam in the camera tube 13. It is assumed that the scanning beam traverses particular stripes (the blue ones in the present embodiment) at substantially the same relative time period during successive field scans. It is further assumed that the chrominance content of a scene does not generally change substantially from field to field of the video information. Every other field contains information relating to the timing of the scanning beam traversing the blue filter stripes. This information is detected by the difference amplifier 70 which effectively subtracts the chrominance portions of the video information of two successive fields. The result of this subtraction is the signal 70A which is representative of the time at which the scanning beam traverses the blue stripes.

The signal 70A is coupled to the "enable" terminal of a first gate 81 and is also coupled to the enable terminal of a second gate 82 via a delay element 85. The output of delay element 85 is also coupled via another delay element 86 to the enable terminal of a third gate 83. Each of the gates received as its other input the output of bandpass filter 50; i.e., the raw chrominance signal 50A. In the present embodiment the delay elements 85 and 86 each introduce a delay of 0.074 microseconds which corresponds to the time that it takes for the scanning beam to traverse a single stripe on the filter 12. Referring again momentarily to FIG. 2, this means that the pulse widths illustrated in the FIGURE are each 0.074 microseconds long. The camera therefore effectively develops color field signals which contain 0.074 microseconds segments corresponding to the red, blue and green primary color components of a scene.

It can now be readily understood that the outputs of the gates 81, 82 and 83 respectively represent the blue, green and red color components of the portion of a scene being scanned by any given instant. The blue video components are in phase with the indexing signals 70A since both depend on the time that the scanning beam traverses the blue stripes. The gate 81 is thus enabled at the appropriate times to sample the signal 51A when it represents a blue scene component. The output of gate 81 is therefore the blue color component signal. Similarly, the gate 82 is enabled at the appropriate times to sample the signal 51A when it represents a green scene component. This follows from the fact that the green stripes are scanned 0.074 microseconds after the blue stripes. The indexing signals 70A are delayed 0.074 microseconds by delay element 85 so that the green video components are in phase with the once delayed indexing signals and the gate 82 generates the green component signal. In similar manner the gate 83 generates the red color component signal by sampling with the twice delayed (i.e., by delay elements 85 and 86) indexing signal.

In the present embodiment the demodulated color component signals R, G, and B are applied to a matrixor 90 which also receives the filtered luminance signal via a delay means 36. The delay 36 is necessary to realign the timing of the luminance and color components in view of the transit time of the color components through the processing circuitry. In the matrixor 90 the luminance and color components are combined to yield signals known as I, Y, and Q in accordance with NTSC standards. An encoder 95 receives these signals and adds the appropriate sync, blanking and subcarrier burst to form a composite NTSC color video signal.

Figure 3:
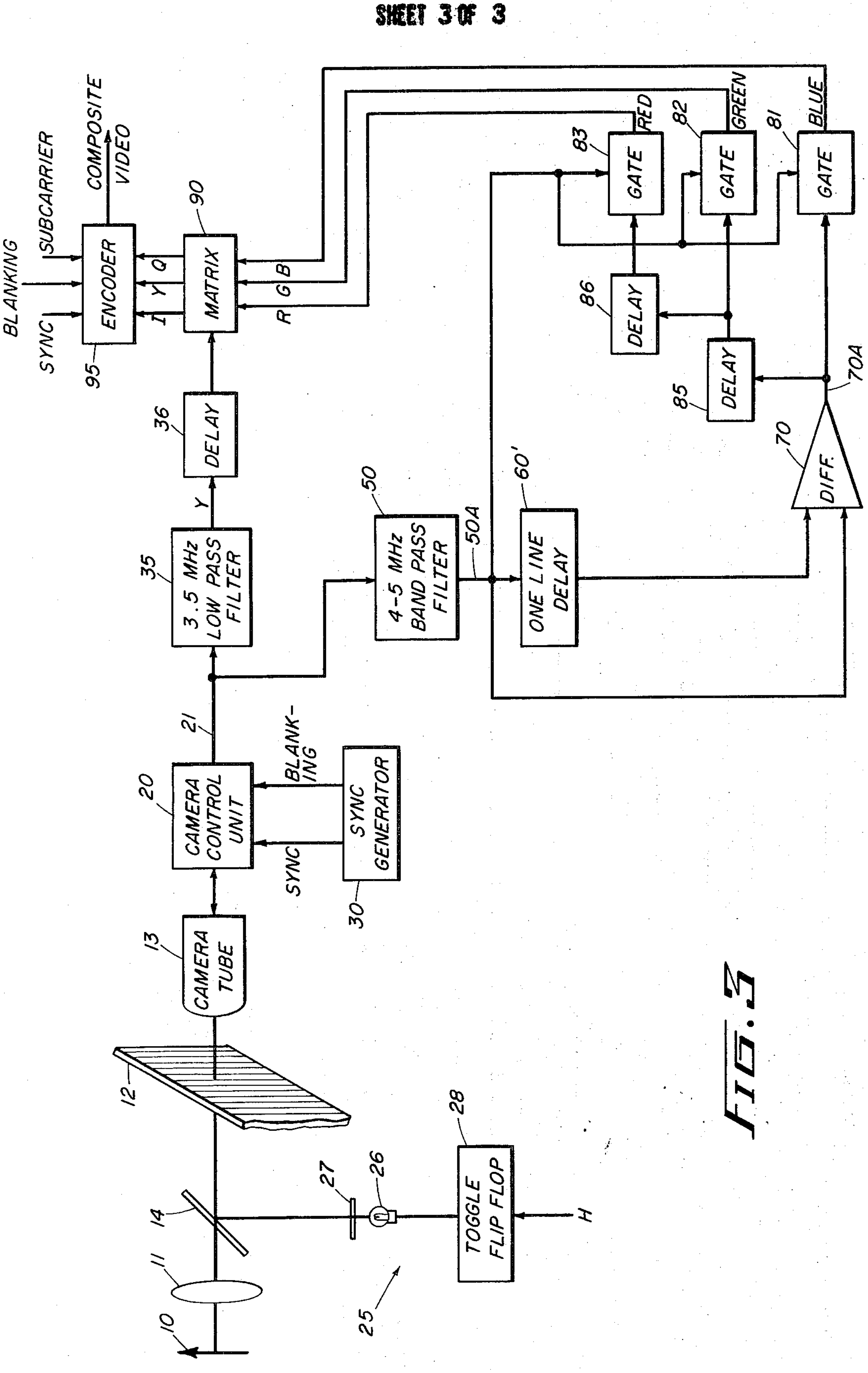
FIG. 3 is a block diagram of a color television camera system in accordance with another embodiment of the invention.

Another embodiment of the invention is shown in FIG. 3. Operation is similar to that of the FIG. 1 embodiment except that the indexing signal is derived by extracting the positions of particular stripes (blue being again selected) by differencing signals of successive scanlines rather than successive fields. The toggle flipflop 28 is triggered by the horizontal timing so that the uniformly colored blue field is superimposed on the image during every other scanline. Consistent with this technique, a one line delay 60' is employed so that successive lines can be differenced to recover the indexing signal. This embodiment has some operational advantage and some operational disadvantage as compared to the embodiment of FIG. 1. An advantage is the relatively high accuracy of a one line delay as opposed to a one field delay. A present disadvantage results from the time integration at the target of available camera tubes. In the embodiment of FIG. 3 it is necessary that the effects of the uniform blue field on the pickup surface (during a given line) diminish sufficiently during the next line to allow recovery of a meaningful indexing signal. Accordingly, it is necessary in this embodiment to employ a camera tube having minimum target storage.

The invention has been described with respect to particular embodiments but it is understood that variations within the spirit of the invention will occur to those skilled in the art. As an example, it is clear that the level of the superimposed uniform field should be adjusted to minimize ultimate noticeability by a viewer while maintaining a level adequate for recovery of the indexing signal. One technique for minimizing noticeability of the uniformly colored field would be to alternately superimpose two different uniform fields having complementary colors. This technique would require additional circuitry and switching, however, to make use of two different indexing signals.

I claim:

1. A color television camera system for producing coherent color video signals representative of the color content of the scene, comprising:

a. a filter disposed in the optical path of the scene, said filter having an array of colored areas thereon;

b. means for electronically scanning the image projected through said filter and for generating color signals representative of the filtered image;

c. means for periodically projecting a uniformly colored field on said filter in conjunction with the scene;

d. means including a delay for receiving the generated color signals and developing a difference signal as between color signals generated during successive periods when the uniformly colored field is present and absent; and e. means for demodulating the generated color signals with said difference signal.

2. A system in accordance with claim 1 wherein said filter array comprises triplets of colored stripes disposed in a direction perpendicular to the scanning direction.

3. A system in accordance with claim 2 wherein said demodulating means comprises means for delaying said difference signal and means responsive to said difference signal and delayed difference signal for sampling said generated signals to produce coherent color video signals.

4. A system in accordance with claim 2 wherein said demodulating means comprises means for delaying said difference signal and gate means enabled by said difference signal and the delayed difference signal for receiving said generated color signals and producing coherent color video signals.

5. A system in accordance with claim 1 wherein said demodulating means comprises means for delaying said difference signal and means responsive to said difference signal and the delayed difference signal for sampling said generated signals to produce coherent color video signals.

6. A color television camera system for producing coherent color video signals representative of the color content of a scene, comprising:

a. a filter disposed in the optical path of a scene, said filter having an array of colored areas thereon;

b. means for electronically field scanning the image projected through said filter and for generating color signals representative of the filtered image;

c. means for projecting, during alternate fields, a uniformly colored field on said filter in conjunction with the scene;

d. means including a delay for receiving the generated color signal and developing a difference signal as between color signals generated during successive fields; and e. means for demodulating the generated color signals with said difference signal.

7. A system in accordance with claim 6 wherein said filter array comprises triplets of colored stripes disposed in a direction perpendicular to the scanning direction.

8. A system in accordance with claim 7 wherein said demodulating means comprises means for delaying said difference signal and means responsive to said difference signal and delayed difference signal for sampling said generated color signals to produce coherent color video signals.

9. A system in accordance with claim 7 wherein said demodulating means comprises means for delaying said difference signal and gate means enabled by said difference signal and the delayed difference signal for receiving said generated color signals and producing coherent video signals.

10. A system in accordance with claim 6 wherein said demodulating means comprises means for delaying said difference signal and means responsive to said difference signal and the delayed difference signal for sampling said generated color signals to produce coherent color video signals.

11. A color television camera system for producing coherent color video signals representative of the color content of a scene, comprising:

a. a filter disposed in the optical path of a scene, said filter having an array of colored areas thereon;

b. means for electronically line scanning the image projected through said filter and for generating color signals representative of the filtered image;

c. means for projecting, during successive lines, a uniformly colored field on said filter in conjunction with the scene;

d. means including a delay for receiving the generated color signals and developing a difference signal as between color signals generated during successive lines; and e. means for demodulating the generated color signals with said difference signals.

12. A system in accordance with claim 11 wherein said filter array comprises triplets of colored stripes disposed in a direction perpendicular to the scanning direction.

13. A system in accordance with claim 12 wherein said demodulating means comprises means for delaying said difference signal and means responsive to said difference signal and delayed difference signal for sampling said generated color signals to produce coherent color video signals.

14. A system in accordance with claim 12 wherein said demodulating means comprises means for delaying said difference signal and gate means enabled by said difference signal and the delayed difference signal for receiving said generated color signals and producing coherent video signals.

15. A system in accordance with claim 11 wherein said demodulating means comprises means for delaying said difference signal and means responsive to said difference signal and the delayed difference signal for sampling said generated color signals to produce coherent color video signals.

16. A method of producing coherent chroma video signals representative of the color content of a scene, comprising the steps of:

a. disposing a filter in the optical path of the scene, the filter having an array of colored areas thereon;

b. electronically scanning the image projected through said filter and generating color signals representative of the filtered image;

c. periodically projecting a uniformly colored field on said filter in conjunction with a scene;

d. forming a difference signal as between color signals generated during successive periods when the uniformly colored field is present and absent; and f. demodulating the generated color signals with said difference signal.

17. A method in accordance with claim 16 comprising the additional step of filtering the color signal from said scanning means to produce luminance signals.

18. A method in accordance with claim 17 comprising the additional step of matrixing and encoding the luminance signals and the coherent chroma signals to produce composite color television signals.

* * * * *